June 30, 1970 T. N. VASSIL 3,518,654
METHOD AND APPARATUS FOR DETECTING A CONDITION
Filed May 16, 1967 4 Sheets-Sheet 1
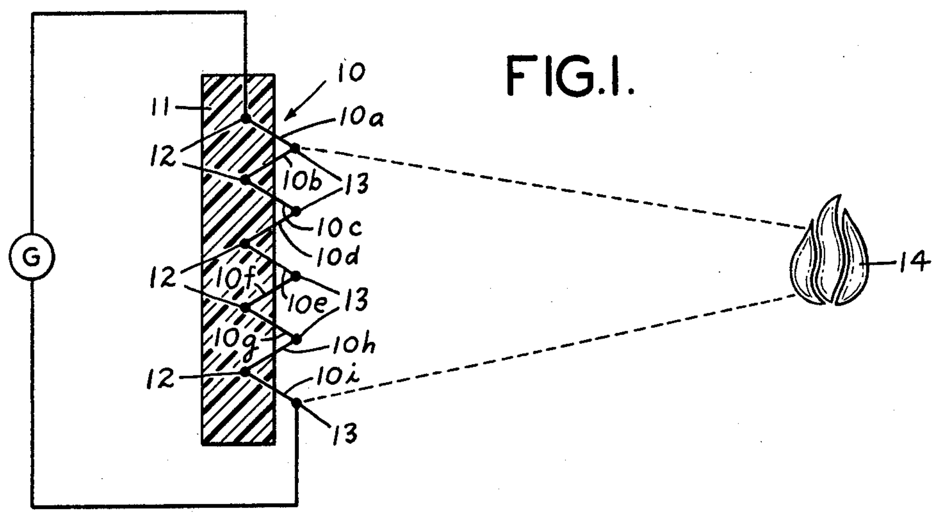
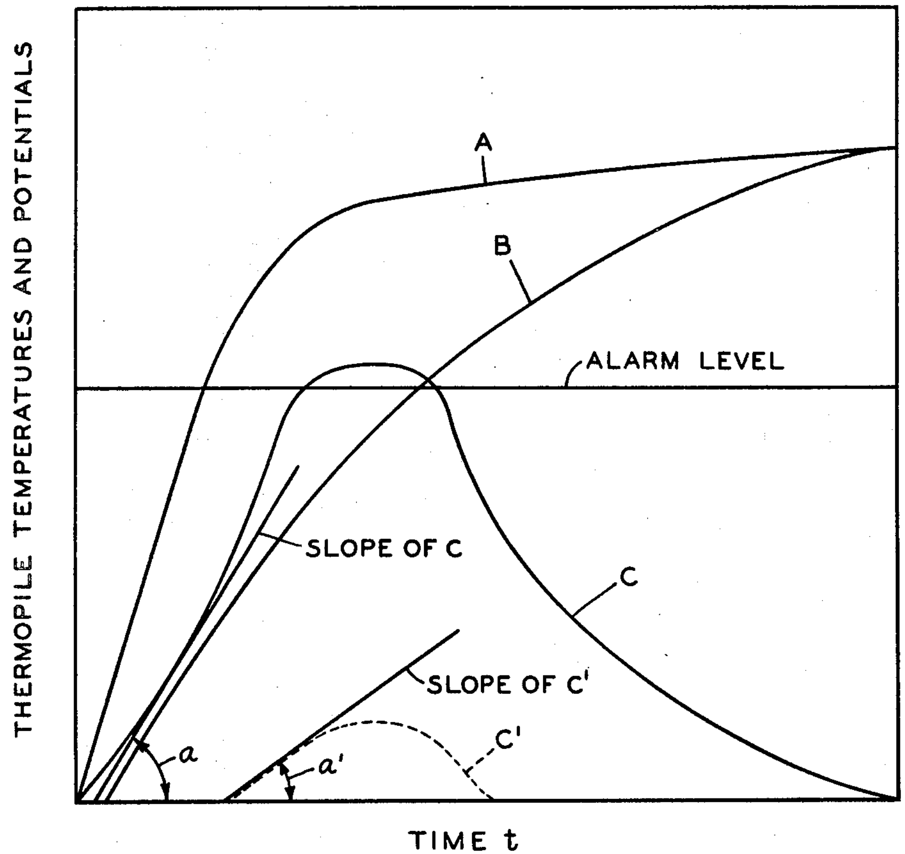

METHOD AND APPARATUS FOR DETECTING A CONDITION
Filed May 16, 1967 4 Sheets-Sheet 2
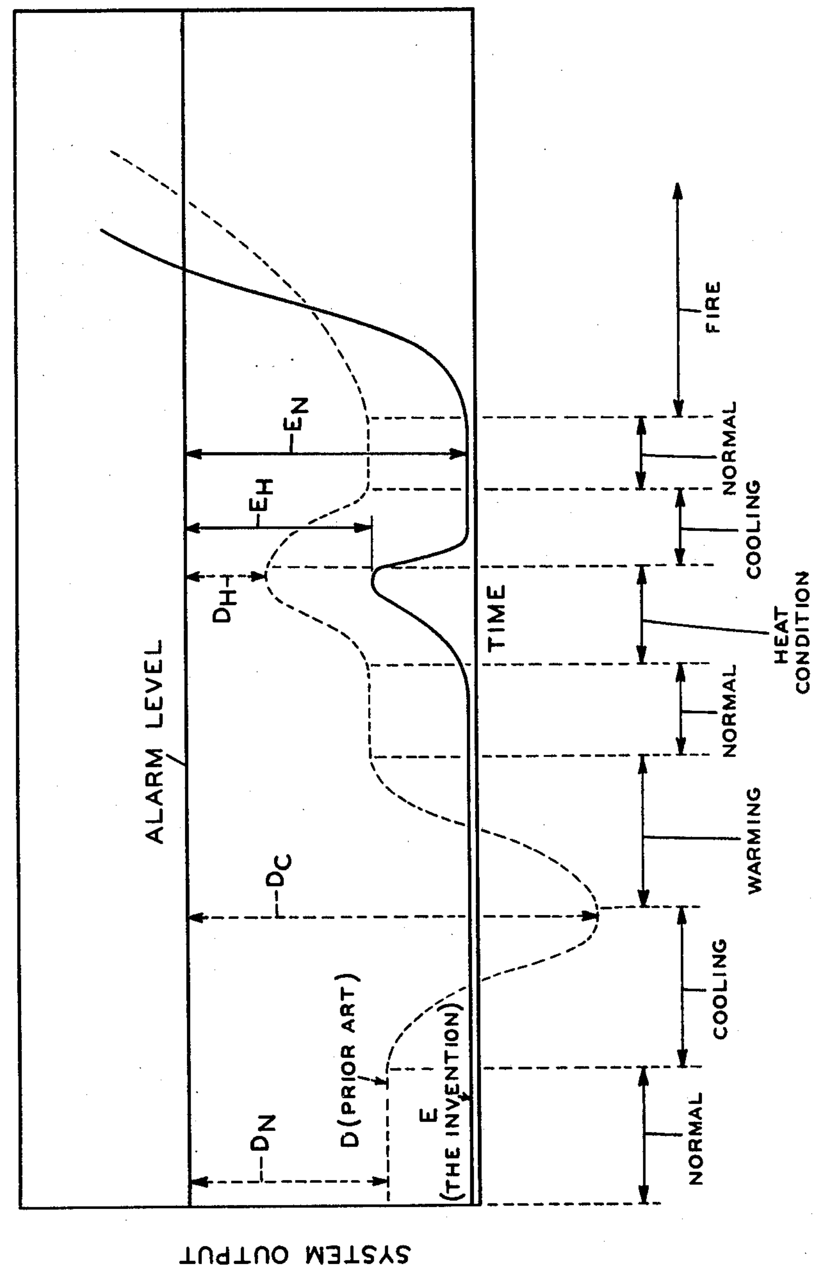

METHOD AND APPARATUS FOR DETECTING A CONDITION
Filed May 16, 1967 4 Sheets-Sheet 3
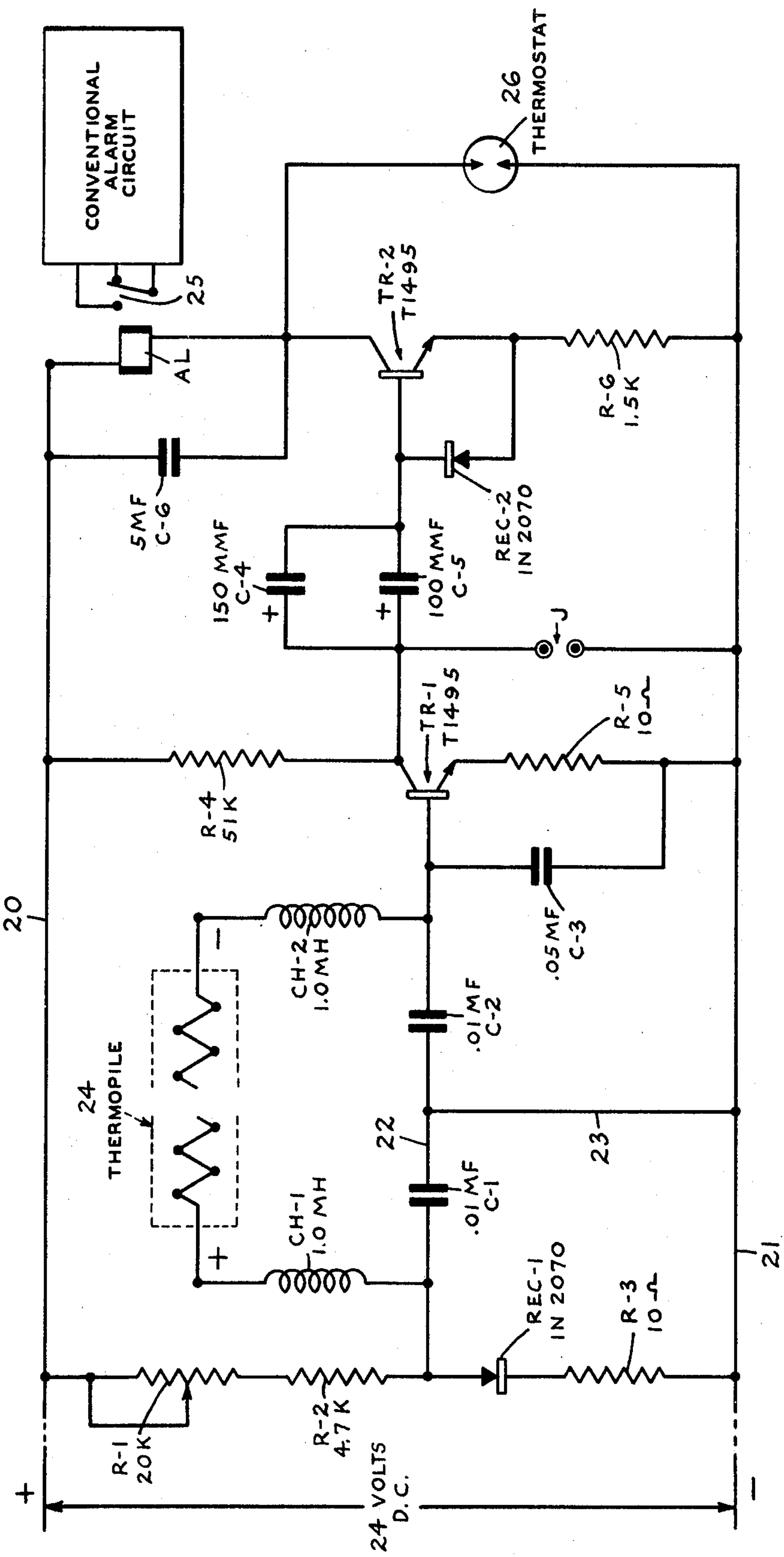

METHOD AND APPARATUS FOR DETECTING A CONDITION
Filed May 16, 1967 
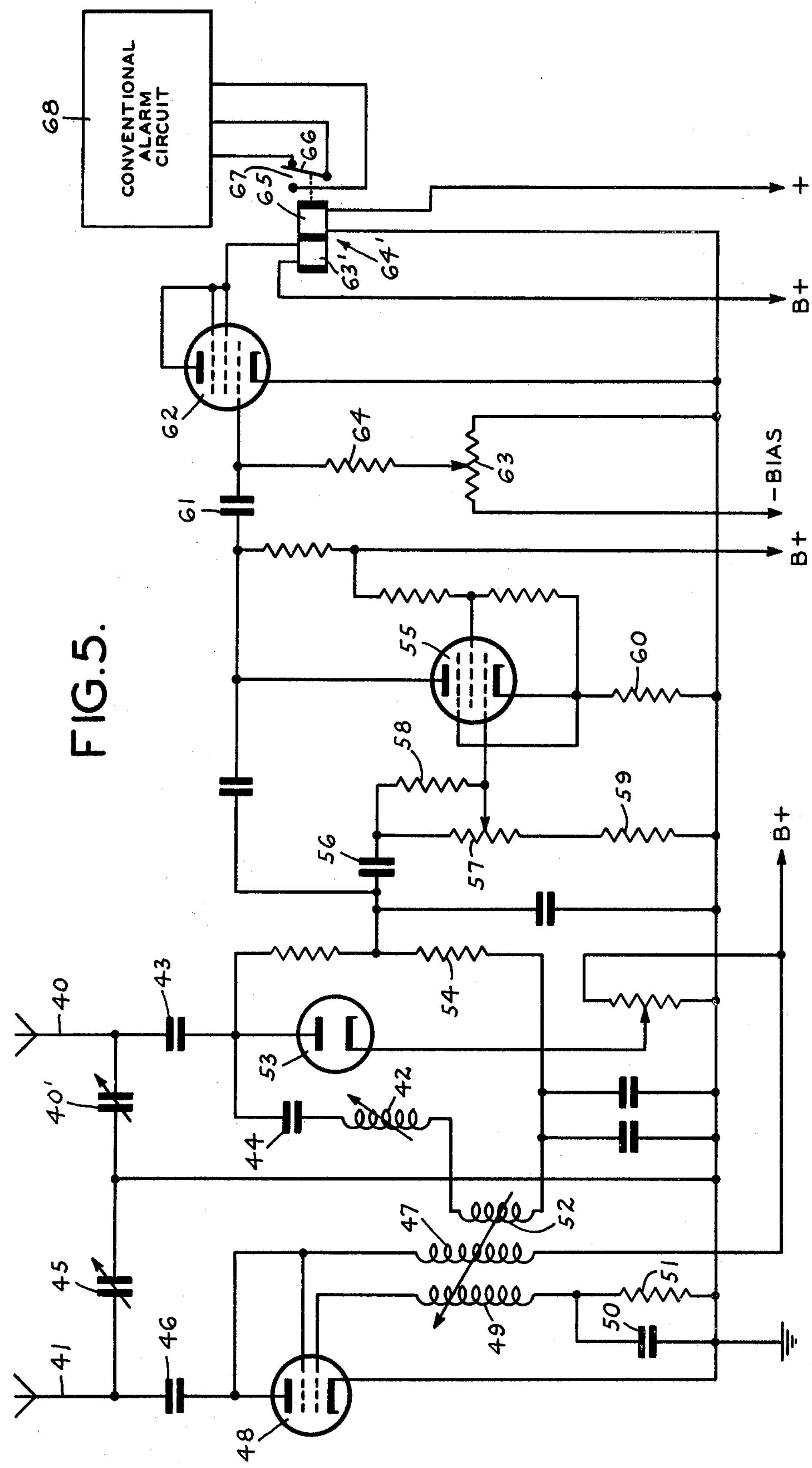

3,518,654
Patented June 30, 1970

3,518,654

METHOD AND APPARATUS FOR DETECTING A CONDITION

Theo N. Vassil, Flushing, N.Y., assignor to American District Telegraph Company, Jersey City, N.J., a corporation of New Jersey Filed May 16, 1967, Ser. No. 638,900
Int. Cl. G08b *13/26, 17/06*
U.S. Cl. 340—228 10 Claims

ABSTRACT OF THE DISCLOSURE

A method and apparatus for improving the stability, speed of response and reliability of electrical protection systems. A quantity representative of the second derivative with respect to time of a measurable phenomenon is monitored to give warning of the occurrence of an undesirable condition.

BACKGROUND OF THE INVENTION

Field of the invention

The invention pertains to the field of electrical communications and specifically to the provision of means automatically responsive to conditions; e.g., capable of producing an indication of the presence of a fire or an intruder in a protected premises, the occurrence of a malfunction which would prevent the proper operation of an automatic fire sprinkler system or the loss of control over an industrial process. Such means are broadly known as electrical protection systems and are employed to monitor such physical phenomena as temperature; pressure, capacitance, etc. Frequently, the phenomenon is converted by a detection device into an analog quantity such as voltage, current, pressure, etc., which varies in direct relation to the original condition under observation.

Description of the prior art

The automatic protection systems employed in the past usually have been of either the simple fixed level type or the more sophisticated rate of change type of operation.

The fixed level type of system produces an alarm signal when the phenomenon being monitored reaches a predetermined magnitude. A typical example is the familiar bimetallic strip thermostat as employed for fire detection purposes. In such an application, the device functions to initiate a warning signal when the temperature in the immediate vicinity reaches a predetermined level. Obviously, the fixed level principle of operation is applicable to the direct monitoring of such phenomena as pressure, the rotational speed of a shaft, the level of the contents in a container, etc., as well as to electrical quantities (voltage, current, capacitance, etc.) which are frequently encountered as the output of a great variety of detecting instruments employed to convert a monitored phenomenon into electrical analogs.

While possessing the virtue of simplicity, the fixed level principle has the distinct disadvantage of the lack of a constant sensitivity of response. For instance, a thermostat designed to operate at 125 degrees and located in an area at a normal temperature of 70 degrees requires a 55 degree rise to reach the alarm level. But on a warm summer day, the ceiling temperature might well be 100 degrees thereby leaving only a 25 degree differential from the alarm level. Conversely, an unheated area in winter time might well fall below the freezing point and result in a 100 degree rise necessary to operate the thermostat. The consequence is an excessive number of false alarms if a thermostat with a low rating is selected or unduly delayed alarm signals if a high rated unit is employed. Unfortunately, the desire to avoid the annoyance of false alarm often overcomes prudence in such matters and results in protection systems of dubious reliability in that quite a large fire may exist for a dangerously long time on a cold day before detection. The same problem obviously exists when phenomena other than temperature are being monitored.

The knowledge that an unwanted condition usually occurs more rapidly than a normally varying ambient condition made it possible through the rate of change principle to improve the reliability of protection systems by setting the alarm level closer to expected ambient conditions. In the case of a fire detection system, the alarm can be initiated when a temperature change of a certain number of degrees occurs within a defined short time period, thus the system can tolerate a gradual increase to 100 or more degrees as the sun rises on a summer day but respond rapidly to the sudden temperature rise caused by a fire. A typical example is the pneumatic type of fire detector comprising a vessel having a small vent and a diaphragm switch. The air within the vessel expands in response to heat and, if the rate of pressure increase is faster than can be relieved by the vent, the diaphragm switch will be operated to initiate the alarm signal. Such "rate of change" systems have an inherent fixed level feature in that a certain amount of output is required to activate the alarm element; in this case, a minimum pressure is needed to operate the diaphragm switch.

Other examples of rate of change systems may be found in the Vassil et al. Pat. No. 2,871,466 which discloses a fire detection system based on the rate of change of the resistance of an electrical conductor when exposed to heat and in the Laakmann Pat. No. 3,189,884 relating to a burglar alarm system responsive to the rate of change of the electrical capacitance of a protected safe when approached by an intruder. The Lindsay Pat. No. 2,455,376 discloses a use of the rate of change principle in connection with an electronic fence for the protection of the perimeter of outdoor area.

While, in general, rate of change system have been known and used with satisfactory results for many years in indoor locations, attempts to employ such systems outdoors have resulted in unsatisfactory operation. The basic reason therefor is that ambient conditions vary more violently outdoors than they do within weather-protected structures and it is necessary to unduly sacrifice sensitivity of response (reliability) to obtain reasonable stability or freedom from an excessive false alarm occurrence rate. A like problem is often encountered in the protection of large, unpartitioned structures such as warehouses, storage sheds and modern mercantile centers.

SUMMARY OF THE INVENTION

It has been the principal object of the invention to provide a novel method and apparatus for the sensing of a condition within an area subject to widely varying ambient conditions and more specifically to provide such a system having distinctly improved reliability, speed of response and stability of operation.

These objectives have been achieved through the novel concept of producing the desired alarm indication when a predetermined rate of change of the rate of change of a changing condition has been attained. Mathematically, the method may be likened to a measurement of the second derivative of a function in the same sense that acceleration, which is the rate of change of velocity, is the second derivative of distance with respect to time for a moving body. Thus, for a body which moves a distance $s$ in time $t$, the velocity or rate of change of distance with respect to time is the first derivative $ds/dt$. The second derivative $d^2s/dt^2$ expresses the acceleration or rate of change of velocity with respect to time.

When, for instance, the present invention is employed to monitor a temperature condition wherein the tempera-T varies with respect to time $t$, the alarm will be initiated when a quantity representative of the second derivative $d^2T/dt^2$ reaches a predetermined value. As will be made apparent hereinafter, the variable function may be any physical phenomenon and the monitoring usually accomplished through the medium of an electrical analog thereof produced by the detection device.

Still further objects, features and advantages of the invention will be apparent from the following description of the principles thereof and its application to various types of protection systems.

BRIEF DESCRIPTION OF THE DRAWINGS

FIG.1 is a diagram illustrating the construction and operation of a thermopile;

FIG. 2 is a chart illustrating the output characteristics of a thermopile;

FIG. 3 is a comparison chart illustrating the operational advantages of the present invention;

FIG. 4 is a schematic diagram of an embodiment of the invention; and

FIG. 5 is a schematic diagram of another embodiment of the invention.

DESCRIPTION OF THE PREFERRED EMBODIMENTS

While the principle of the present invention may be applied to many types of protection systems, it is anticipated that the most immediate application will be found in fire detection systems intended for the protection of such outdoor facilities as lumber yards, freight yards, oil storage depots, parking lots, etc., as well as large indoor areas. Accordingly, the invention will be first described in connection with such an application.

The basic principle may be understood from an analysis of the action of a thermopile in the presence of a source of heat. FIG. 1 shows a conventional thermopile 10 as being composed of a number of short wires **10*a*–10*i* of two different metals (such as iron and copper) joined together endwise in alternation and compressed into a zigzag pattern so that one group of alternate junctions may be imbedded in a block of heat insulating material 11. The junctions thus protected are termed the unexposed junctions 12 while the remaining junctions are termed the exposed junctions 13. When a source of heat such as a fire 14 occurs within range, an electrical potential is generated at the junctions of the dissimilar metals which may be detected by a galvanometer G connected to the terminals of thermopile 10**.

The combined output of the exposed junctions 13 is represented by a curve A in FIG. 2. Curve A first rises rapidly from the moment the radiant heat energy arrives at the thermopile and then levels off as temperature stability is reached, i.e., the heat loss from the exposed junctions equals the heat being received from the source causing the junction temperature to remain constant. Curve B represents the output of the unexposed junctions 12 which warm more slowly than the exposed junctions due to the effect of insulating block 11 but eventually reach the temperature of the exposed junctions. Since the individual junctions of the thermopile are connected in electrical opposition, the net output of the thermopile is the difference between the outputs of the exposed and unexposed junctions and is indicated by the curve C. Curve C rises to a maximum and then falls to zero when both sets of junctions reach the same temperature. Inasmuch as the thermopile potentials are directly proportional to the junction temperatures, the curves A, B and C are representative of the potentials and temperatures simultaneously.

When a thermopile is employed as a rate of change fire detector, as described, for example, in Evans Pat. 2,432,145, the system is so arranged that the alarm is initiated when the combined output curve C reaches a predetermined level as indicated on the chart. In the present invention, the alarm is initiated when the slope of curve C reaches a predetermined value indicated by the angle $a$. As an example, consider the functioning of both systems when a small heat disturbance occurs with sufficient rapidity to overcome the thermal lag of the thermopile and produce an output indicated by the broken line curve C′. The prior art apparatus would not respond because the curve C′ (representing the first derivative $dT/dt$) does not rise to the alarm level indicated by the horizontal line. The present invention does not respond because the slope of curve C′ (representing the second derivative $d^2T/dt^2$ and indicated as the angle $a'$) does not increase to the alarm level indicated by the angle $a$.

The advantages of the present invention over the prior art will be best recognized through a comparison of the response of both systems to the circumstances that may be expected to arise at an actual outdoor fire detection installation.

Referring now to FIG. 3, there is shown a chart of the output of a rate of change system of the prior art and of a system constructed in accordance with the invention. At time zero, a normal condition exists wherein the exposed junctions are, by reason of the sun, somewhat warmer than the unexposed junctions. The prior art system therefore has a certain output indicated by the horizontal portion of the broken line curve D. The system of the invention has no output at all at this time for reasons to be explained hereinafter. However, to clarify the drawing the solid line curve E is shown slightly displaced above the horizontal axis, a condition which could occur in fact only if the exposed junctions were increasing in temperature at a uniform rate.

The normal condition persists for a short time until a cloud obscures the sun and is accompanied by a cooling breeze. The exposed junctions cool more rapidly than the unexposed junctions due to the effect of the insulating block and actually become colder than the unexposed junctions. The output of the prior art system now goes negative but the output of the invention remains at zero, again for reasons to be explained hereinafter.

With the departure of the cloud, the sun warms the thermopiles and curve D turns positive, but the output of the system of this invention (curve E) remains at zero. After a brief period of normal conditions, an unusual heat situation develops as the result of the sun's rays being reflected directly into the detectors from the surface of a pool of rain water. The outputs of both systems rise until the transient heat condition passes and then return to normal. Finally, a true fire condition occurs and the system of the invention reaches the alarm level before the prior art system. The horizontal alarm level line on FIG. 3 represents a predetermined value of the slope of the output curve in the case of the present invention and simply a fixed level of rate of change (first derivative) for the prior art system.

The significant improvement in the stability of the sensitivity of response of the invention over the prior art is demonstrated by the length of the vertical arrows shown on FIG. 3. The broken line arrow $D_N$ indicates the sensitivity of the prior art system under normal conditions while the arrows $D_C$ and $D_H$ indicate the respective sensitivities under periods of abnormal cold and heat respectively and a considerable variation is evident between $D_C$ and $D_H$. In comparison, the variation between the comparable arrows $E_N$ and $E_H$ for the system of the invention under normal and abnormal heat conditions is markedly reduced.

Furthermore, it will be noted from FIG. 3 that, as the systems return to normal after the transient heat condition, the output of the system of the invention returns to normal far more rapidly than that of the prior system. This rapid restoration of normal sensitivity provides the additional benefit that, over a period of days, the system of the invention will be at normal sensitivity a greater percentage of the time.

Finally, it will be observed that when the fire occurred the system of the invention responded more swiftly because it sensed the rate of change (slope) of the output curve rather than a fixed level of the output curve.

It will be evident to those skilled in the art that the present invention introduces a rate of change element between a rate of change detection device or system and the alarm indicating means. One form of an electronic circuit for this purpose is illustrated by FIG. 4. In FIG. 4 the values of the various circuit components are indicated in ohms, microfarads and millihenries. While specific component ratings are shown in the drawing and various potentials mentioned in the following description they are given for illustrative purposes only and are not to be construed as limitations of the scope of the invention.

The circuitry of FIG. 4 comprises a number of parallel circuits connected to a source of potential (which typically might be 24 volts D.C.) by conductors 20 and 21 connected to the positive and negative sides respectively. One of the circuits comprises, in series connection, a potentiometer R1, a fixed resistor R2, a silicon diode REC–1 (which provides temperature compensation for the base-emitter junction of a transistor TR–1) and a fixed resistor R–3. These four components form a voltage divider whose mid-point is coupled to the base of transistor TR–1 through series connected capacitors C–1 and C–2 by a conductor 22. The junction of capacitors C–1 and C–2 is connected to the negative side conductor 21 by a conductor 23. Another parallel circuit comprises transistor TR–1, the collector of which is connected to the positive conductor 20 through a resistor R–4 and the emitter of which is connected to negative conductor 21 through a resistor R–5. A capacitor C–3 is connected between the base of transistor TR–1 and the low potential side of resistor R–5.

A thermopile 24 has its positive side connected through a radio frequency choke CH–1 to the junction of capacitor C–1 and the voltage divider while the negative side is connected through a radio frequency choke CH–2 to the base of transistor TR–1. The chokes CH–1, CH–2 and capacitors C–1, C–2, form a radio frequency filter which shunts, via conductor 23, to the negative conductor 21 any radio frequency signals which may be picked up by thermopile 24. The capacitor C–3 serves in a similar vein for any alternating current components that may escape the filter network.

The collector of transistor TR–1 is coupled to the base of a transistor TR–2 through the parallel combination of capacitors C–4 and C–5. The emitter of transistor TR–2 is coupled to the negative conductor 21 through a resistor R–6. The base of transistor TR–2 is coupled to the emitter thereof through a diode REC–2. The collector of transistor TR–2 is coupled to the positive conductor 20 through the winding of an alarm relay AL which is shunted by a capacitor C–6 provided to by-pass any alternating current components that may exist in the collector-emitter current of transistor TR–2. The contacts 25 of the alarm relay AL are connected to a conventional alarm circuit to provide whatever audible or visual indictation of an alarm signal may be desired, e.g., at a remote control station. A set of jacks J may be provided between the collector of transistor TR–1 and the negative conductor 21 to permit the charge on capacitors C–4 and C–5 to be readily determined by means of a portable voltmeter.

In operation, the transistor TR–1 will normally be conductive, the transistor TR–2 non-conductive and potentiometer R–1 adjusted so that the voltage at the capacitors C–4, C–5 (as measured at jacks J) will be in the range of 4 to 5 volts. The thermopile 24 is so connected as to oppose the forward bias voltage for transistor TR–1 existing at the anode of diode REC–1.

When the thermopile output increases in response to warming of the exposed junctions, the resulting reduction in the forward bias voltage causes the transistor TR–1 to become less conductive. As the current flow in the collector circuit decreases, the voltage drop across the resistor R–4 also decreases. The voltage at the collector of transistor TR–1 accordingly increases (because this voltage plus the IR drop across resistor R–4 must equal the supply of 24 volts) and the capacitors C–4 and C–5 charge to a higher level. As the charging current of capacitors C–4 and C–5 flow through the base of transistor TR–2, current will flow through the emitter-collector circuit of this transistor TR–2 and the coil of alarm relay AL. When this current is sufficient, alarm relay AL will become energized and contacts 24 will transfer to operate the conventional alarm circuit. The fact that transistor TR–2 is normally non-condutive is the reason for the first portion of the curve E in FIG. 3 remaining on the horizontal axis while the prior art system has an output under like conditions.

As the exposed junctions of the thermopile cool, the output decreases thereby increasing the forward bias for transistor TR–1 which becomes more conductive and, as the voltage drop increases across resistor R–4, the charging voltage for capacitors C–4, C–5 decreases. Under extreme conditions, the charging voltage may be reduced but cannot become zero because of the high initial bias. Of more importance is the fact that the charging voltage cannot go negative, thereby maintaining curve E on the horizontal axis while the prior art system dips below with deleterious effect upon the sensitivity of response.

Furthermore, when the charging voltage for the capacitors C–4, C–5 decreases, the diodes REC–2 shunts the transistor TR–2 and provides a quick discharge path to the negative conductor 21. The rapid discharge of the capacitors swiftly returns the system of the normal level as indicated by the sharp decline of curve E after the transient heat condition depicted in FIG. 3. By thus reducing the time interval during which the system is in a state of abnormal sensitivity, the overall stability of the sensitivity of response is significantly augmented.

The particular value of the slope of the output curve to which the system responds is determined by the time constant of the electronic circuit and may be varied as desired by proper selection of the values of capacitors C–4, C–5, the resistor R–6 and the beta of transistor TR–2. A single capacitor of equivalent rating may of course be used in place of the parallel combination of capacitors C–4, C–5. However, for practical considerations, it is generally more convenient to employ the parallel combination illustrated. The capacitors C–4 and C–5, the base emitter circuit of transistor TR–2 and resistor R–6 form a differentiating circuit which causes the collector current of transistor TR–2 to increase in proportion to the rate of change of the thermopile output, which in turn varies in proportion to the rate of change of temperature in the protected space. For computation of the time constant of the differentiating circuit the beta of transistor TR–2 may be used.

If desired, the system may be provided with a fixed level type of operation feature by connecting a thermostat 26 between the collector of transistor TR–2 and the negative conductor 21 as shown in FIG. 4. The thermostat which ordinarily would be of a rather high temperature rating to avoid false alarms and intended as a safety back-up for the primary system, closes its contacts under the application of sufficient heat thus shunting the transistor TR–2 and connecting the alarm relay directly across the power supply conductors 20, 21 to produce the alarm signal.

Those familiar with the electronic arts will recognize that while a particular configuration of resistance-capacitance elements has been disclosed, there are a number of other means for producing the desired rate of change effect that could be employed with equal benefit.

It is further evident that the principle of the invention could readily be applied to the rate of change fire detection system of the previously mentioned Vassil Pat. No. 2,871,466 by the addition of an electronic rate of change circuit as described herein to the original rate of resistance change circuit disclosed in that patent. In like manner, the aforementioned pneumatic type of fire detection system could be provided with transducer means to convert the pressure into an electrical quantity such as voltage or capacitance whose rate of change could be monitored to produce the desired alarm signal. Also, the ionization type of fire detector (wherein the conductance of an ionized chamber varies as products of combustion enter the chamber) may easily be provided with a rate of change circuit in accordance with the invention.

The supervision of industrial processes often involves the monitoring of temperature and pressure and the supervision of automatic fire sprinkler systems is largely concerned with the pressures in the hydraulic portions of the system. From the above descriptions of the application of the invention to various types of fire detection systems, it will be evident to those skilled in the art that the principles of the present invention may readily be applied advantageously to the monitoring of temperatures and pressures for industrial supervision and fire sprinkler system applications. For certain applications such as the rotational speed of a shaft, it would be convenient to provide transducing means such as a tachometer element to convert the rotational speed into an electrical quantity.

A typical example of the application of the invention to intrusion detection devices can be provided from the said protection system of the previously mentioned Laakmann Pat. No. 3,189,884. In this system, alarms are produced in response to the rate of change of the capacitance of a protected safe upon the approach of an intruder and the addition of a second rate of change circuit could be accomplished readily. Similarly, the invention can be used to advantage with an outdoor electronic fence perimeter protection system of the general type described in the Lindsay Pat. No. 2,455,376. An application of the invention to the perimeter protection system of the Lindsay patent is illustrated in FIG. 5.

In FIG. 5 there are shown diagrammatically antennas 40 and 41 which are intended to represent the capacitive fence antennas of the Lindsay patent and will each be formed by one or more wires extending in respective directions along a boundary to be protected.

The antenna 40, which has a capacity-to-ground of variable character represented by the variable capacitor 40′, is connected to a tuning or resonant circuit composed of tuning inductance 42, through blocking condensers 43 and 44. Antenna 41 having a variable capacity-to-ground, represented by the variable capacitor 45, is connected through a similar blocking or isolating condenser 46 to the plate inductance 47 of an oscillator tube 48. Inductance 47 is inductively connected to the grid inductance 49, while a capacitor 50 and resistor 51 serve to supply "C" bias to the oscillator tube 48. Inductance 47 has associated therewith a link circuit 52 connecting the oscillator circuit to the tuning or resonant circuit.

The radio frequency voltage in the tuning circuit is detected by a diode rectifier tube 53 which is provided with a load resistor 54, and a connection is provided between the rectifier circuit and the grid of amplifier tube 55, through the coupling condenser 56 and a potentiometer 57 and resistor 58. The lower portion of potentiometer 57 and a resistor 59 serve as a grid leak for tube 55. Power for the oscillator 48 is supplied by a power source designated B+.

With the antenna 41 connected as shown, the tube 48 will oscillate, since its plate circuit is inductively coupled to the grid inductance 49 by the inductance 47, and the frequency of oscillations will be determined by the value of the inductance 47 and the antenna-to-ground capacity 45. The series effect of the capacity 46 can be neglected. The radio frequency oscillations so generated are conducted by means of the link circuit 52 to the tuning or resonant circuit composed of the tuning inductance 42 and the antenna-to-ground capacity 40′. Again since the capacities 44 and 43 are large and the inductance of 52 is small, the resonant frequency of this tuning circuit is determined mainly by the value of the elements 40′ and 42.

The voltage of oscillator frequency injected into the tuning circuit is small and nearly constant in amplitude but the voltage between antenna 40 and ground is larger and reaches maximum when coil 42 is adjusted and tuned to the oscillator frequency. This coil is usually adjusted so that the antenna 40 voltage to ground is halfway between maximum and minimum. In this manner approach to antenna 41 increases this voltage while approach to antenna 40 decreases this A.C. voltage. This radio frequency voltage is applied to the diode rectifying tube 53 and produces a direct current voltage across its load resistor 54 which increases or decreases as the R.F. voltage applied to tube 53. The changing D.C. voltage output of rectifier 53 is transmitted as negative or positive pulses to the grid of the output amplifier tube 55 through the large condenser 56 and resistor 58 and potentiometer 57, causing either a decrease or increase in current flow through the anode circuit of tube 55. Capacitor 56, potentiometer 57 and resistor 59 act as a differentiating circuit so that the voltage at the grid of tube 55 will vary essentially as the rate of change of the output current of diode 53 and hence as the rate of change of capacitance sensed by the antenna system. A typical value for capacitor 56 would be 1 microfarad, while typical values for potentiometer 57 and resistor 59 would be 5 megohms and 1 megohm, respectively.

The operating point of tube 55 is determined by the bias potential developed across a self-biasing resistor 60 connected between the cathode of tube 55 and ground. The amplified output of tube 55 is supplied from the plate of tube 55 through a capacitor 61 to the grid of a triode connected pentode tube 62. The grid of tube 62 is supplied with bias potential from a negative source through a potentiometer 63 and a resistor 64, the other end of the potentiometer winding being connected to ground.

Capacitor 61 and resistor 64, which typically might have values of 1 microfarad and 5 megohms, respectively, serve as a second differentiating circuit. The grid bias of tube 62 is adjusted by means of potentiometer 63 so that the plate current flowing through winding 63′ of alarm relay 64′ during normal, i.e., non-alarm, conditions is equal to the current flowing through biasing winding 65 of relay 64′. Thus under normal conditions alarm relay 64′ will be deenergized. An increase or decrease in the plate current of tube 62 beyond a selected limit will unbalance relay 64′ and cause the same to be energized, thereby opening back contacts 66 and closing front contacts 67 to operate alarm circuit 68. Energization of relay 64′ will occur for a selected minimum rate of change of the rate of change of voltage across diode load resistor 54. The system sensitivity can be adjusted by moving the slider of potentiometer 57.

Still further applications for the principle are found in the more modern intrusion detection systems of the ultrasonic type and in systems which operate on optical principles. Ultrasonic systems detect intruders by monitoring the Doppler effect produced in the protected area while optical systems are generally similar in principle but employ light rather than ultrasonic sound as the operating medium. Both types of system operate on the rate of change principle and the introduction of the concepts of the present invention would improve the sensitivity, speed of response and reliability of both systems.

What is claimed is:

1. The method of producing an alarm signal upon the occurrence of an alarm condition at a selected place subject to varying ambient conditions comprising the steps of measuring at said place a physical quantity associated with the occurrence of said alarm condition at said place and associated also with a variation in one of said ambient conditions, producing a first signal voltage which varies in proportion to the rate of change of said measured quantity, producing a second signal voltage which varies in proportion to the rate of change of said first signal voltage and is a strictly positive valued function, and directly applying said second signal voltage to an alarm means to produce an alarm signal when the rate of change of the rate of change of said measured quantity exceeds a selected value, said selected value being more than the rate of change of the rate of change of said measured quantity normally encountered at said place from said varying ambient conditions at said place.

2. The method set forth in claim 1 in which said physical quantity is temperature and said alarm condition is a fire.

3. The method set forth in claim 1 in which said physical quantity is one which varies with the approach of a human body to said selected place.

4. The method set forth in claim 1 in which said measuring step results in the production of an electrical potential which varies in proportion to the instantaneous magnitude of said physical quantity and in which said first signal voltage is produced by differentiating said electrical potential.

5. The method of detecting the occurrence of a fire in a space subject to substantial variations in ambient temperature, comprising the steps of producing an electrical potential which varies substantially directly with the instantaneous temperature of at least a portion of said space, differentiating said potential to produce a first signal voltage which varies substantially directly with the rate of change of the instantaneous temperature of said portion of said space, differentiating said first signal voltage to produce a second signal voltage which varies substantially directly with the rate of change of the rate of change of the instantaneous temperature of said portion of said space and is a strictly positive valued function, and directly applying said second signal voltage to an alarm means to produce an alarm signal when said second signal voltage reaches a predetermined value representative of a rate of change of said rate of change of the instantaneous temperature of said portion of said space characteristic of a fire in said space, said predetermined value being more than the value of said second signal voltage characteristic of normal ambient temperature variations in said portion of said space.

6. An electrical protection circuit for protecting a place subject both to occurrence of an alarm condition and to varying ambient conditions, comprising:

(a) means in said place for measuring a physical quantity associated with the occurrence of said alarm condition and associated also with a variation in one of said ambient conditions arranged to produce a first signal voltage which varies in proportion to the rate of change of said measured quantity;

(b) a differentiating circuit;

(c) means to apply said first signal voltage to said differentiating circuit to produce a second signal voltage which varies in proportion to the rate of change of the rate of change of said measured quantity and which yields a strictly positive valued function;

(d) an alarm circuit arranged to be operated at an applied signal level above a threshold level; and (e) means to directly apply said second signal voltage to said alarm circuit in a sense to cause the latter to be operated, said threshold level being selected to correspond to a value of said second signal voltage corresponding to occurrence of an alarm condition at said place but being above any level corresponding to a value of said second signal voltage occurring as a result of normal variation in ambient conditions at said place.

7. An electrical protection circuit as set forth in claim 6 in which said physical quantity is temperature.

8. An electrical protection circuit as set forth in claim 6 in which said physical quantity is one which varies in magnitude with the approach of a human body to said place.

9. A fire alarm system for protecting a space subject to the occurrence of a fire and subject also to variations in ambient temperature, said system comprising:

(a) a thermopile located in said space so as to be subject to temperature variations therein and arranged to produce an output voltage which varies substantially in proportion to the rate of change of temperature in said space, (b) a first transistor amplifier, (c) means to apply said thermopile output voltage as a signal input to said first amplifier and in a sense to decrease the level of conduction of said first amplifier, (d) means to bias said first amplifier to a conductive condition for values of said thermopile output voltage characteristics of normal temperature conditions in said space, (e) a second transistor amplifier, (f) a differentiating circuit including the output circuit of said second amplifier and having a capacitive element intercoupling the output of said first amplifier and the input of said second amplifier and yielding a strictly positive valued function, (g) means to bias said second amplifier to a nonconductive condition for values of said first amplifier output substantially below a level characteristic of a fire in said space, higher values of the output of said first amplifier causing said second amplifier to become conductive, (h) an alarm circuit coupled to the output of said second amplifier and arranged to provide an alarm signal when the output of said second amplifier exceeds the threshold value.

10. A fire alarm system as set forth in claim 9 in which a rectifier element is connected across the input electrodes of said second amplifier and is poled to provide a short time constant discharge path for said condenser when the charging voltage for said condenser decreases.

References Cited

UNITED STATES PATENTS

| | | | |
|---|---|---|---|
| 2,432,145 | 12/1947 | Evans | 340—228 X |
| 2,901,740 | 8/1959 | Cutsogeorge | 340—228 X |
| 2,976,523 | 3/1961 | Duffy | 340—228 X |
| 3,235,857 | 2/1966 | Bagno. | |

JOHN W. CALDWELL, Primary Examiner

P. PALAN, Assistant Examiner

U.S. Cl. X.R.

340—258